J. M. CLEM.
Railroad Rail-Joints.

No. 135,082.  Patented Jan. 21, 1873.

UNITED STATES PATENT OFFICE.

JAMES M. CLEM, OF OPELIKA, ALABAMA.

IMPROVEMENT IN RAILROAD-RAIL JOINTS.

Specification forming part of Letters Patent No. 135,082, dated January 21, 1873.

*To all whom it may concern:*

Be it known that I, JAMES M. CLEM, of Opelika, in the county of Lee and State of Alabama, have invented a new and Improved Railway-Rail Joint, of which the following is a specification:

My invention consists of a flat pin or bolt with a slot through it near the point, which is used in place of the ordinary screw-bolt to fasten the fish or joint plates, the bolt being fastened by a key and spring-washer instead of the ordinary nuts and fastenings therefor, the key having a notch in the outer edge, so that a shoulder above and below the bolt becomes locked when the key is driven in, so that it cannot work loose, all as hereinafter described.

Figure 1:
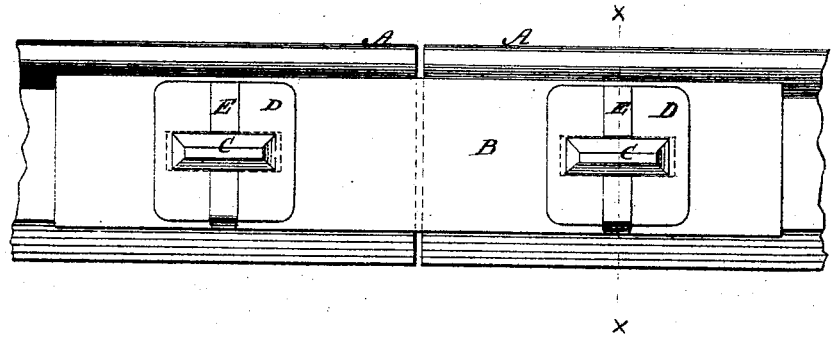
Figure 2:
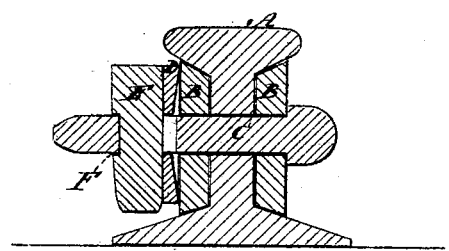

Figure 1 is a side elevation of a rail-joint constructed according to my invention, and Fig. 2 is a transverse section taken on the line $x\ x$ of Fig. 1.

Similar letters of reference indicate corresponding parts.

A represents the two rails to be secured together; B, the fish or joint plates; C, the fastening-bolt; D, the spring-washer; and E, the key. The bolt is made wide and flat, so as to afford the requisite amount of metal without requiring the hole for it in the rail to be made as wide in its transverse direction as is necessary in the case of the round bolts, so that the rail is not weakened as much as with the round bolts. Moreover, I am enabled thereby to make one bolt large enough to have the strength of two ordinary bolts, and thus I only have one hole in the rail, by which its strength is further preserved. The washer D is concave on the side next to the fish-plate to allow it to spring back when the key is driven in, and then spring forward again when the end wall of the slot for the key through the bolt drops into the notch F a sufficient amount to take up all the slack and to bind the plates with an elastic pressure, which will recover so as to keep them tight when the plates contract, and yield when they expand.

These fastening devices are much cheaper to make than the ordinary bolts and nuts, more simple to put together, and more reliable. No extra fastening is required, and only a sledge or hammer, such as used for driving the spikes, is needed for making the joint.

By this construction, if the washer becomes loosened and the key works up the flange of wheel will force it back into its appropriate position.

Having thus described my invention, I claim as new and desire to secure by Letters Patent—

The horizontal flat bolt C combined with a vertical notched key, E, held by a spring-washer, as and for the purpose described.

JAMES M. CLEM.

Witnesses:
W. B. THOMAS,
R. W. TURNER.